(12) United States Patent
Eckardt

(10) Patent No.: US 6,542,979 B1
(45) Date of Patent: Apr. 1, 2003

(54) HIDDEN DISK PARTITION

(75) Inventor: Donald J. Eckardt, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,007

(22) Filed: Mar. 31, 1999

(51) Int. Cl.[7] .............................................. G06F 12/02
(52) U.S. Cl. ............................ 711/173; 713/2; 713/100
(58) Field of Search ...................... 713/2, 100; 711/173

(56) References Cited

U.S. PATENT DOCUMENTS 5,136,711 A * 8/1992 Hugard et al. ................. 713/2
5,701,477 A * 12/1997 Chejlava, Jr. ................. 713/2

* cited by examiner

Primary Examiner—Hiep T. Nguyen
(74) Attorney, Agent, or Firm—Fish & Richardson P.C.

(57) ABSTRACT

A hidden disk partition is accessed using a supplemental driver that is stored outside the master boot record of a disk drive. The boot loader used is standard, and hence can be refreshed as necessary. If a non standard partition is found, and a special key is pressed, the main master boot record is combined with additional information to form a special composite master boot record at runtime. This composite master boot record can read the additional information.

13 Claims, 2 Drawing Sheets

| $06_n$ | | $06_n$ | | $00_n$ | | $98_n$ | |
|---|---|---|---|---|---|---|---|
| B I G D O S | | B I G D O S | | U N U S E D | | H I D D E N | |

HIDDEN DISK PARTITION

FIELD

The present specification describes a computer system with a run time configurable system BIOS.

BACKGROUND

Certain hard disks, including a hard disk on a personal computer, are often "partitioned" into multiple logical subdivisions. Each partition is essentially a separate portion of the disk, which is addressed and handled separately from the other partitions. The partition attribute table of the disk tells the operating system the extent of the partition as well as its type.

The partition table in a personal computer includes entries showing beginning, end, type, and size for each partition. There are also certain rules governing the partitions. For example, all sectors and tracks in the partition must be contiguous.

The normal boot process of a PC type computer actuates the computer for reading from the partitions. At an appropriate point during the boot process, the system BIOS investigates the partition table to find the different disk partitions. The operating system is loaded from a bootable partition. After the operating system is fully loaded, the bootable partition, and all other partitions that the system is capable of interpreting, become fully accessible by the user. These partitions that the system is capable of understanding are referred to herein as "legal" partitions. Partition types that the operating system cannot recognize are correspondingly referred to as "illegal".

Most of the time, the user wants access to all programs in the PC. There are times, however, when it is desirable for a party, e.g., a system integrator, to separate certain contents in the PC from certain other contents. For example, a special program or set of programs (a "suite") for occasional use by the end user or by a repairman might be put in a hidden disk area.

This could be hidden for several different reasons. A suite could be for use of trained personnel only. It could be programs that the end user must not modify in any way. A suite could also require a special file structure or boot method not compatible with normal system operation.

A preferred way of providing such a separate suite in the past has been to create a separate dedicated partition for just the suite.

The present inventor recognized that there are certain limitations with this technique. For example, the user can still access this suite. It is often also difficult to boot directly to this partition. Under certain circumstances, this hidden portion on the special partition could be undesirably modified. Or the master boot record or file attribute table may be inadvertently overwritten or "refreshed".

The present system describes an alternative to the above.

SUMMARY OF THE INVENTION

The present system operates a computer hard disk to allow booting to either the standard partition, or a non-standard partition based on whether a specified operation, e.g. a specified key sequence at a specified time, a hot "key" depression, is initiated, e.g., during start up of the computer hard disk. If the operation is not initiated, then the operation returns and hence boots from the next partition. The computer hard disk is started in the normal way, using the normal operating system, and using the driver from the master boot record (MBR). This reads only the standard partitions of the disk.

If the operation is initiated, then a second driver is used that is resident outside the master boot record. This second driver is combined with the main MBR, on the fly, to create a new MBR that is capable of reading the non-standard partition of the hard disk.

In one mode, the system boots to either the standard part, or the non-standard part. When booting to the non-standard part, the whole partition table is available, and thus all parts of the disk, legal and illegal partitions, are all available.

BRIEF DESCRIPTION OF THE DRAWINGS

These and other aspects of the invention will now be described with reference to the attached drawings, in which.

DESCRIPTION OF THE PREFERRED EMBODIMENTS

Figures 1, 2:
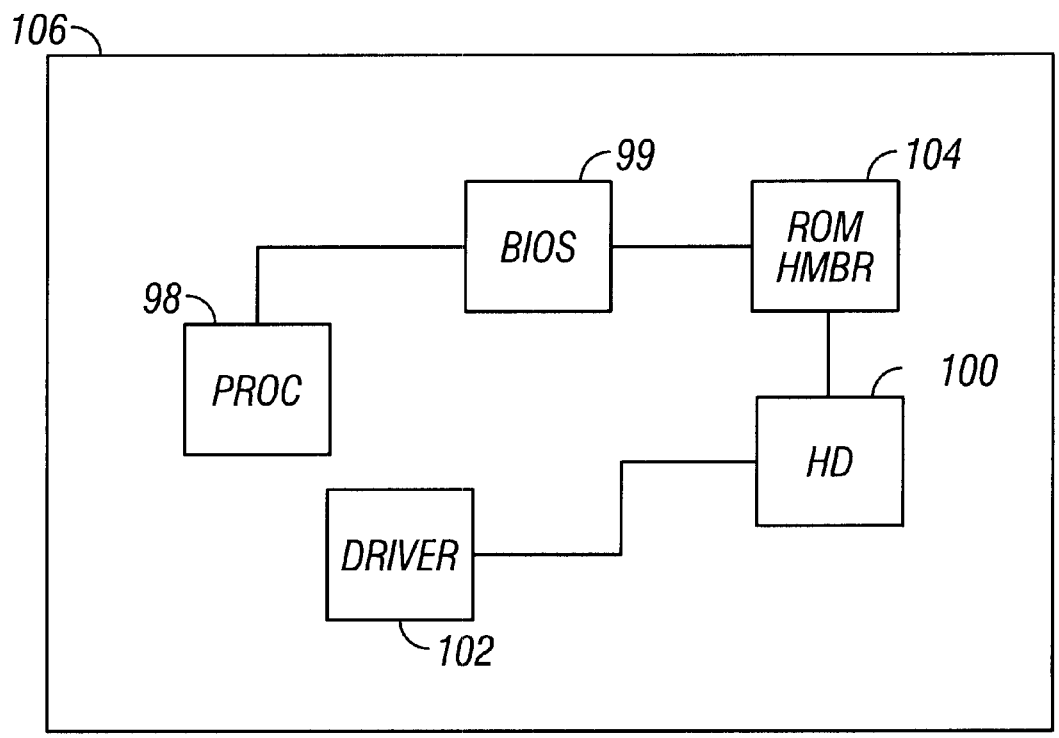
FIG. 1 shows a simplified diagram of a partition table.
FIG. 2 shows a system board.

A partitioned hard disk contains a master boot record located on the first physical cylinder of the hard disk. The remainder of the disk is divided into logical partitions (up to four per physical disk) of arbitrary size.

Each logical partition contains inclusively either a logical drive or an extended partition. An extended partition may be further divided into logical drives. The first sectors of a logical drive contains a boot record; the boot record contains the location information necessary to locate and load the operating system contained in that partition. The structure of an extended partition is irrelevant for this discussion and will not be described here.

A master boot record consists of two parts: the boot loader and the partition table (PT). The boot loader is considered "standard" code and is indiscriminately "refreshed" by fdisk and other MS-Dos and Windows utilities during normal operation.

The boot loader contains the code to read a boot record from the first sector of a specified partition during normal boot operation.

The partition table describes the physical starting and ending sectors of each partition on the disk as well as partition type information for each and an indication as to which partition is active for booting.

The present system relies on a feature in many operating systems that governs the way an operating system reads from a hard drive. Typically, the operating system will only read partition types that it can understand. The operating system can understand only partition types that have an appropriate driver within the boot record.

Typical legal partition types are:

| | |
|---|---|
| 00h | Partition not used |
| 01h | DOS 12bit FAT |
| 02h | Xenix |
| 03h | Xenix |
| 04h | DOS 16-bit FAT |
| 05h | Extended DOS partition |

-continued

| | |
|---|---|
| 06h | "BigDOS" partition (>32Mb) |
| DBh | Concurrent DOS |

Other codes are possible for other operating systems.

If a particular partition on the drive is labeled as a type that is invalid or has no driver, then the operating system will not recognize that partition. Typically, those operating systems will simply ignore the existence of such a partition. Partition modification programs, such as fdisk, will display the partition, but they may not be able to affect it, since it is of an illegal type.

If the operating system does not recognize the partition, it is possible to provide a special driver for the partition. This driver could be provided as part of a special, i.e., non standard, master boot record. That driver allows the partition and its contents to be accessed. However, this requires forming a non-standard master boot record, i.e., not the same kind of driver used during a standard installation of the operating system.

Certain operations of the operating system, however, cause a refresh of the master boot record. For example, in the WINDOWS (TM) operating system, fdisk often refreshes the boot loader in the master boot record. Such a refresh will remove the non-standard partition driver, preventing the user from later accessing the non-standard partition.

A diagram of an exemplary file allocation table is shown in FIG. 1. This system uses a file allocation table which supports four partitions. The first three partitions are shown using a legal-type partition, type 85. The last partition on the disk, defining the last N consecutive cylinders of the disk, are specified with an partition that is not supported by the operating system that is used, herein referred to as an illegal type partition. This disclosure suggests partition type 95 to prevent the partition from being confused or accessed as a normal partition. However, any illegal or unrecognized partition type could be used to hold the hidden partition.

The operation of the preferred embodiment uses a special boot sequence that modifies the master boot record in a way that allows conditional access to and booting from this hidden partition. The conditional operation can be based on a specified operation during boot time, including a hardware switch or more preferably depression of a hot-key.

According to this embodiment, the master boot record is the standard boot record for the operating system that is used. This allows the master boot record to be safely refreshed during a refresh cycle.

The driver for the illegal partition is provided by a special supplemental portion including a driver for the illegal partition. This supplemental portion, herein called a "hidden partition master boot record," is stored outside the master boot record.

The hidden partition master boot record can be, for example, installed on the system board 106 either as an option ROM, or as an extension to the BIOS 99. The BIOS 99 selectively accesses the special driver in the hidden partition master boot record to access the otherwise-hidden partition, by forming a special master boot record at runtime, as described herein.

FIG. 2 shows the hardware of the system in block diagram form. The overall system is driven by the processor 98. Initial start up or boot of the computer, however, is based on the contents of the BIOS 99. In a standard, normal boot process:

1. BIOS picks next boot device from boot list. This discussion assumes that the next boot device is the "Primary Hard Disk".
2. The MBR is read from first track of hard disk into RAM. The MBR contains the boot loader and the partition table.
3. Control is transferred to boot loader.
4. The boot loader scans the attached partition table looking for an active partition (i.e., one marked with active flag of 80h).
5. Once an active partition is located, the boot record (BR) is read into RAM from the first physical sector associated with that partition.
6. Control is transferred to the BR.
7. BR reads to correct sector(s) from its logical partition into RAM that contain the operating system.
8. Control is transferred to the operating system.

The present system includes additional features. First,

1. The BIOS picks next boot device from boot list. This discussion calls this the "Hidden Partition".
2. Control is transferred to ROM code associated with the "Hidden Partition". This ROM code is called the "Hidden Partition MBR Loader" (HMBRL).

The hidden partition master boot record is preferably stored in a read only memory, or ROM 104, that is located on the system board 106. The standard driver reads a different partition or partitions than the hidden partition master boot record.

This embodiment uses an option ROM 104 with additional driver information. The additional driver for the hidden partition master boot record is stored outside of the master boot record for the hard disk as part of the option ROM. The hidden partition MBR and the standard MBR are combined at run time to generate a special MBR. This special MBR allows the master boot record for the hard disk to be refreshed at any time without effecting the ability to read the hidden partition.

Figure 3:
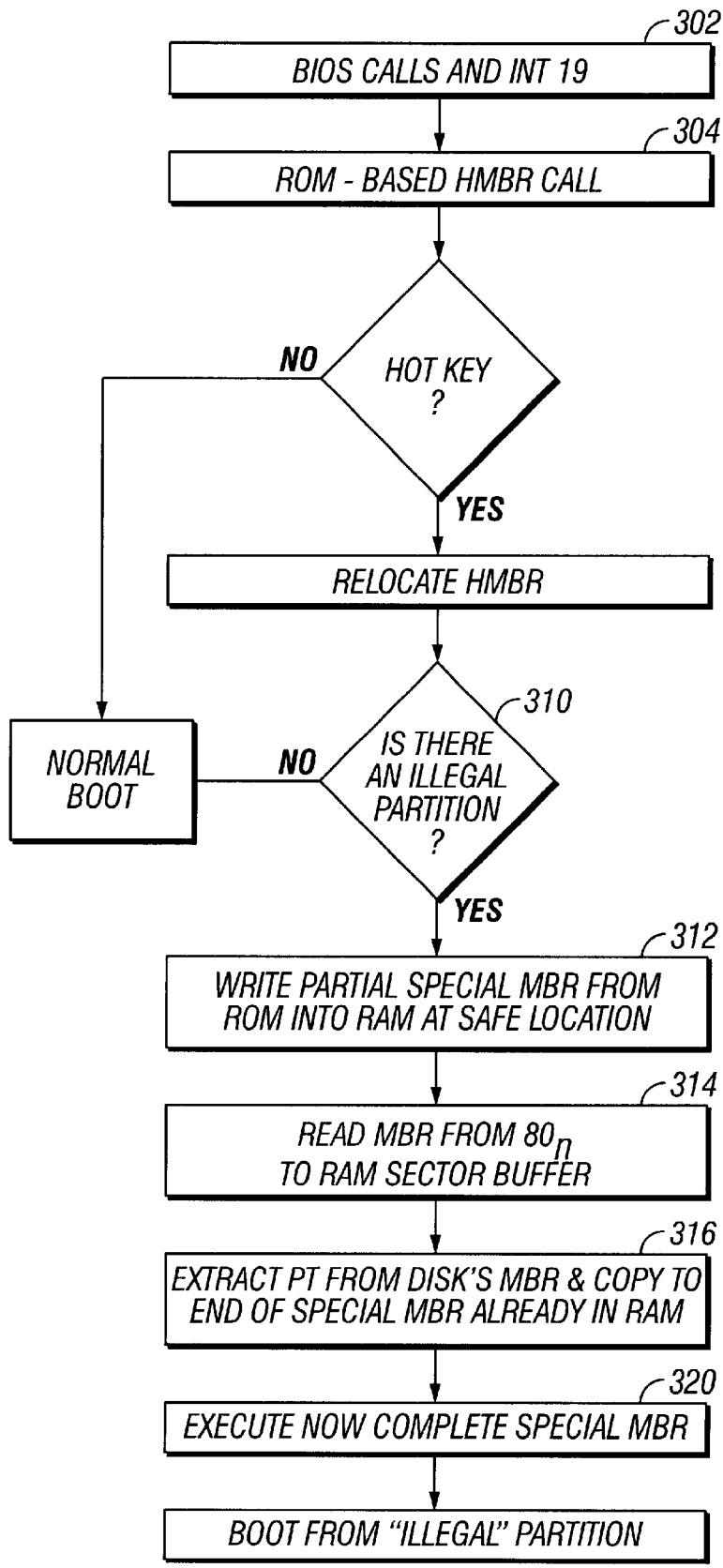
FIG. 3 shows a flowchart of operation of the special startup routine of the preferred embodiment.

The BIOS must also be modified to operate as shown and described with reference to the flowchart of FIG. 3.

Step 300 represents the existing BIOS initial calls which initiate operations of the computer. The BIOS then calls the hidden partition master boot record at step 304. This includes a routine which is initially executed at step 306 to determine if the hot-key has been actuated. If not, operation continues, and the BIOS will try to find the next booting device. Presumably, this would continue with the normal BIOS booting process, whereby the normal/standard master boot record is read into memory and used to interpret and read the disk partitions. This normal booting process is well-known in the art, and will not be further discussed herein. It should be reiterated, however, that since no driver for the illegal partition is loaded during this normal boot process, the illegal partition will not be recognized by the operating system. The normal part of the disk is read, so that only this first part of the hard disk, is read. In this case, the system cannot read the second part of the hard disk that is stored within the illegal partition. This means that the illegal partition cannot be read or modified.

If the hot-key has been pressed at step 306, however, the hidden partition master boot record is read from the ROM and combined with the "real" MBR on the fly to form a new composite MBR. The composite master boot record relocates itself at step 308 to a safe place in RAM where it will not interfere with normal system operations. The routine reads the real master boot record and partition table from the hard disk. The partition table is copied to the end of the hidden partition master boot record and becomes a part of the booting routine.

Normally at this point in booting, the real master boot record is in RAM. When the hot key is pressed, the composite master boot record, including the partition table, is loaded in RAM in place of the real master boot record.

At step 310, the HMBRL reads the primary hard disk's MBR into RAM. The PT of this MBR is scanned looking for a specific type of "illegal type" partition, for example, type 98*h*. A partition of this type is treated as a "hidden bootable partition". If an illegal partition is found, the system forms a special boot record using the 3 step process outlined below with reference to steps 312, 314 and 316. If not, the loader exits, continuing with a normal boot. The BIOS will continue boot process with next device in boot table. Eventually a boot the "primary hard disk" will be attempted. Process will proceed as in "normal boot process" above; after boot, hidden partition will not be accessible.

If the "hidden" partition is found on the disk, a special boot loader is first copied into RAM from ROM (actually part of the HMBRL). First the partial special MBR is written to RAM at step 312. Then, that partial special MBR is combined with the standard MBR from sector 80*h*, and written to the RAM sector buffer at step 314. The partition table of the primary hard disk's MBR (sector 80*h*) is extracted at step 316 and appended to the boot loader of step 314, creating a complete but specialized "hidden partition MBR" (HMBR).

Control is then transferred to the boot loader within the HMBR at tep 318, which executes the now-complete special MBR.

The boot loader then boots from the "illegal" partition, at ste 320. First, the boot loader scans the attached partition table looking for the hidden partition (i.e., the one marked with type 98*h*). The boot record (BR) is read into RAM from the first physical sector associated with that partition. Control is then transferred to the boot record.

The boot record reads to correct sector(s) from its logical partition into RAM that contain the operating system, and control is transferred to the operating system.

Although only a few embodiments have been described in detail above, those of skill in the art recognize that many modifications are intended and predictable from the disclosed embodiments. For example, the additional driver could be stored in any memory media.

All such modifications are intended to be encompassed within the following claims.

What is claimed is:

1. A method of operating a computer hard disk, comprising:
    partitioning said hard disk to include a first partition type which is recognized by the operating system of the computer, and a second partition type that is not recognized by the operating system of the computer;
    detecting whether a specified operation is initiated during start up of the computer hard disk;
    if said operation is not initiated, then starting up the computer hard disk using a first driver for the computer hard disk from the disk master boot record, to read only said first partition type of said computer hard disk; and
    if said operation is initiated, then using a second driver from the disk that is resident outside said master boot record, in a read only memory source to read said second partition type, of said computer hard disk, different than said first part of said computer hard disk.

2. A method of operating a computer hard disk, comprising:
    partitioning said hard disk to include a first partition type which is recognized by the operating system of the computer, and a second partition type that is not recognized by the operating system of the computer;
    detecting whether a specified operation is initiated during start up of the computer hard disk;
    if said operation is not initiated, then starting up the computer by reading said first driver from a read/write memory source, to read only said first partition type of said computer hard disk; and
    if said specified operation is initiated during start up of the computer hard disk then using a second driver by reading said second driver from a read only memory source to read said a second partition type that is not recognized by the operating system of the computer.

3. A method as in claim, 1 wherein said specified operation is a press of a specified key during a specified time.

4. A computer system, comprising:
    a processor;
    a hard drive, partitioned to have at least two partitions, a first partition including a master boot record for a specified operating system, and said first partition being of a type which can be read by said specified operating system, and a second partition, of a type that said specified operating system cannot read; and
    a hidden partition master boot record storage device, storing a hidden partition master boot record of a type that allows interpreting said second partition,
    wherein said processor in response to a specified operation at a specified time, to create a composite master boot record based on both said master boot record, and said hidden partition master boot record, to operate based on said hidden partition master boot record to read contents of said second partition.

5. A system as in claim 4, further comprising a system board, holding said processor, and wherein said hidden partition master boot record storage device is a read only memory located on said system board.

6. A method of operating a computer, comprising:
    providing a hard drive which is partitioned into multiple partitions, including a first type of partition that can be recognized by an operating system of the computer, and a second type of partition that cannot be recognized by the operating system;
    allowing a portion of master boot record of said hard drive to be refreshed by the operating system without erasing said second type of partition; and
    initiating operation of said computer by reading contents of either said first type of partition, or said second type of partition based on a specified operation, after said allowing.

7. A method, comprising:
    detecting whether a specified operation is initiated during start up of the computer hard disk;
    operating, if said specified operation is in a first state, to boot from a master boot record for the operating system being used;
    operating, if said specified operation is in a second state, different than the first state, to form a new master boot record using said master boot record and additional information outside said master boot record; and
    preventing said additional information from being altered during a disk refresh operation.

8. A method as in claim 7, wherein said hard disk includes legal partitions, which are standard for said operating system, and non legal partitions, which are not standard for said operating system.

9. A method as in claim 8, wherein said operating if said specified operation is in the second state reads records for both said legal and said illegal partitions.

10. A method as in claim 7, wherein said new master boot record is stored outside of said new master boot record, and said booting from said new master boot record comprises reading said new master boot record into memory.

11. A method as in claim 10, wherein a partition table is read into memory along with said new master boot record, to allow both legal and illegal partitions of said hard disk to be accessed.

12. A computer readable storage medium, operating to initiate actions of a computer, having portions for selectively allowing reading of a hidden disk partition, for use in conjunction with a disk drive having a master boot record and at least one storage area outside the master boot record, the computer program comprising instructions for causing a computer to:

detect whether a specified operation is initiated during start up of the disk drive;

if said operation is not initiated, then start up the disk drive in a normal way using a first driver for the disk drive from the disk master boot record, to read only a first part of said disk drive;

if said operation is initiated, then read a second driver from the disk drive that is resident outside said master boot record, to read a second part of said disk drive, different than said first part of said disk drive; and prevent contents of said second driver from being changed by a partition refresh operation.

13. A system as in claim 12, wherein said second driver causes boot of the computer from the second part.

* * * * *